(No Model.)
C. H. JACOT.
MUSIC BOX.
No. 362,087. Patented May 3, 1887.
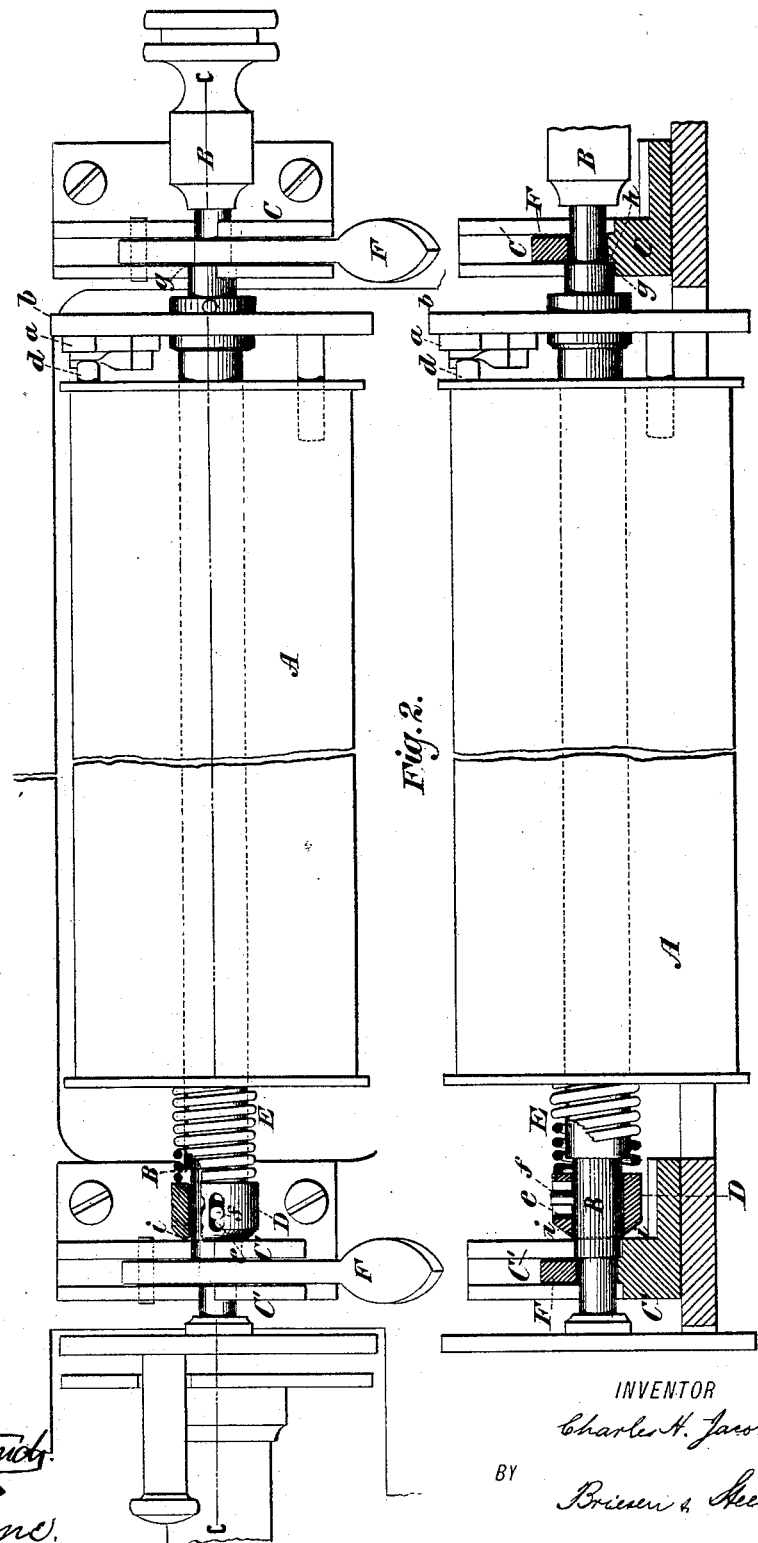
WITNESSES:
Gustave Dieterich
T. F. Bourne
INVENTOR
Charles H. Jacot
BY
Briesen & Steele,
ATTORNEYS.

UNITED STATES PATENT OFFICE.

CHARLES H. JACOT, OF HOBOKEN, NEW JERSEY.

MUSIC-BOX.

SPECIFICATION forming part of Letters Patent No. 362,087, dated May 3, 1887.

Application filed March 26, 1887. Serial No. 232,482. (No model.)

*To all whom it may concern:*

Be it known that I, CHARLES H. JACOT, of Hoboken, Hudson county, New Jersey, have invented certain new and useful Improvements in Music-Boxes, of which the following is a full, clear, and exact description.

This invention relates more particularly to that class of music-boxes which are provided with interchangeable cylinders; and it has for its object to provide means to keep the cylinder-shaft always in a true position in the bearings.

The invention consists in mounting upon the cylinder-shaft a movable collar, which will be pressed by the ordinary cylinder-moving spring into contact with the stationary bearing at one end of the shaft. The spring crowds the cylinder in the opposite direction against the tune-changing cam which is carried by the shaft, and the same pressure crowds the shaft itself into a certain particular position.

Reference is to be had to the accompanying drawings, forming part of this specification, in which—

Figure 1 is a top view of a music-box cylinder and connections, part being in section. Fig. 2 is a section on line $c\ c$, Fig. 1; and Fig. 3 is a sectional and end view of the movable collar.

A in the drawings is the cylinder or pin-barrel, B the cylinder-shaft, and C C' the bearings for the shaft. $a$ is the tune-changing cam, hung to a disk, $b$, carried by the shaft B, which cam engages the pin $d$ on one end of the cylinder A. These parts are of the ordinary or suitable construction.

Near the opposite end of cylinder A, and mounted upon the shaft B, is the movable collar or sleeve D, which is pressed upon and into engagement with the stationary bearing C' by the spring E, the opposite end of which spring E bears against the cylinder A, and presses the pin $d$ on said cylinder into engagement with the cam $a$ in the ordinary manner. The collar D has a slot, $e$, which receives a pin, $f$, secured to the shaft B, to limit the movement of the collar upon the shaft; but it is evident that the slot $e$ may be made in the shaft and the pin secured to the collar to accomplish the same result; or other means to limit the play of the collar upon the shaft may be used, if desired. The collar D is preferably beveled at its outer end, as at $i$.

The shaft B has a shoulder, $g$, which bears against the shoulder or face $h$ of the bearing C, as best seen in Fig. 2. When the said shoulders $g$ and $h$ are pressed against each other, the disk $b$ will be in its proper position, and hence the pin-cylinder will be in the correct position with reference to the comb-teeth.

This invention operates as follows: The spring E presses the collar D against the stationary bearing C', which acts as a purchase for the spring, and at the same time the spring presses the pin $d$ on cylinder A against the tune-changing cam $a$. The pressure of pin $d$ upon cam $a$ will be transmitted to the disk $b$, and thence to the shaft B. Consequently the spring E, by having its purchase on the sleeve D, crowds the shaft B, so as to press its shoulder $g$ against the shoulder or face $h$ of the bearing C. From this it will be seen that the single spring E serves the double purpose of keeping the cylinder in position on the shaft to regulate the tunes and of keeping the shaft itself in position in its bearings.

It is evident that the spring E and collar D could bear against any other object than the bearing C' without departing from the spirit of my invention. To lift the shaft B and cylinder A out of the bearings, the latch-levers F are first turned back, and when the cylinder and shaft are lifted out the slot $e$ and pin $f$ prevent the collar D from slipping too far along the shaft, but at the same time allow it to have a slight outward motion, so that when the shaft is placed in its bearings again the sleeve will be pushed back slightly by means of the bevel $i$ riding on the bearing C', thereby compressing the spring and keeping a steady pressure on the cylinder and shaft.

By the single spring E, I am able to adjust the shaft B and the cylinder A in position—a function for which heretofore two springs were required.

Having now described my invention, what I claim is—

1. The shaft B and cylinder A, combined with the movable collar D and spring E, said spring being adapted to move the cylinder on the shaft and the shaft itself against the face $h$ of its bearing, substantially as described.

2. In a music-box, the movable collar D and means for limiting its movement, cylinder A, and shaft B, in combination with the spring E and bearing C', said spring being adapted to press the collar against the bearing and the shaft against the face h of its bearing, substantially as described.

3. In a music-box, the combination of the shaft B, movable collar D, having slot e, pin f, spring E, bearings C C', and cylinder A, all arranged to operate substantially as described.

C. H. JACOT.

Witnesses:
HARRY M. TURK,
CHARLES G. M. THOMAS.